Nov. 3, 1936.   C. W. WEISS   2,059,423

TRANSMISSION

Filed July 11, 1936

Carl W. Weiss
INVENTOR
BY Redding, Greeley & O'Shea
ATTORNEYS

Patented Nov. 3, 1936

2,059,423

UNITED STATES PATENT OFFICE 2,059,423

TRANSMISSION

Carl W. Weiss, Brooklyn, N. Y.

Application July 11, 1936, Serial No. 90,105

2 Claims. (Cl. 74—198)

This invention relates to transmissions of that type in which a sphere is interposed between a rotating disc and a cylinder or drum and in which variation of the speed of transmission is accomplished by shifting the sphere on a radius of the disc, away from or toward the center of the disc and in a line parallel with the axis of the drum or cylinder. Failure to secure positive action, without the aid of pressure creating devices, has characterized such transmissions as heretofore produced and has rendered them unacceptable for many uses, even those in which, as in the present case, the transmission is intended for light duty, both low speed and low torque. In the effort to develop a transmission of the type referred to in which, within the prescribed limits of speed and torque the failure in positive action shall be overcome, it has been found that the desired result can be accomplished by such relative displacement of the spherical body and the drum or cylinder that the angle of contacts of the disc, sphere and drum, that is, the lines drawn tangent to the points of contact are within the angle of friction of the materials employed. It has been found that when this factor is present, the disc rotating in the proper direction, the ball and drum rotate without slipping at a speed ratio depending upon the relation of the disc radius to the ball line of contact and the drum radius. The drum radius being constant, the speed of transmission depends only upon the length of the radius from the center of the disc to the point of contact of the sphere, the drum stopping when the sphere contacts the center of the disc. Obviously the axis of the drum and the line of movement of the sphere must be parallel with each other and parallel with the surface plane of the disc and to enable the attainment of the factor referred to, in order that the drive shall be positive, the axis of the drum must be offset with respect to the prolonged axis of the disc to insure true movement of the sphere on a radius of the disc and to overcome any tendency of the sphere to roll away from the disc radius on which it moves.

It will be understood that the angle of friction various somewhat with the materials used and that the angle of friction as herein contemplated is the maximum angle of inclination from the horizontal of a plane surface of the given material of one member at which there will be no slip between such member and another member of the same or like material placed on it.

The invention will be more fully explained hereinafter with reference to the accompanying drawing in which it is illustrated, and in which.

Figure 1:
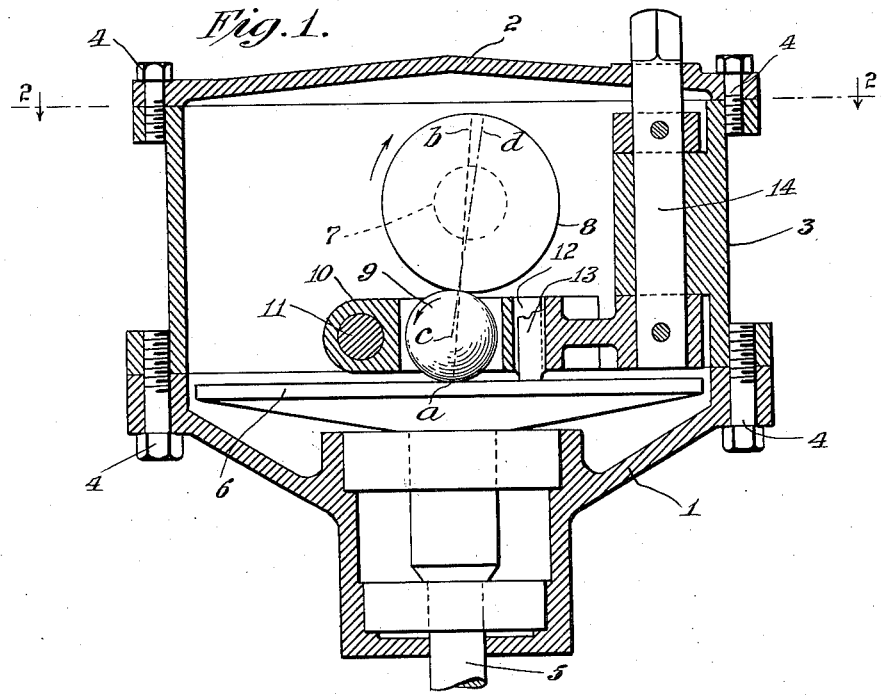
Figure 1 is a view in sectional elevation of a transmission constructed in accordance with the invention.
Figure 2:
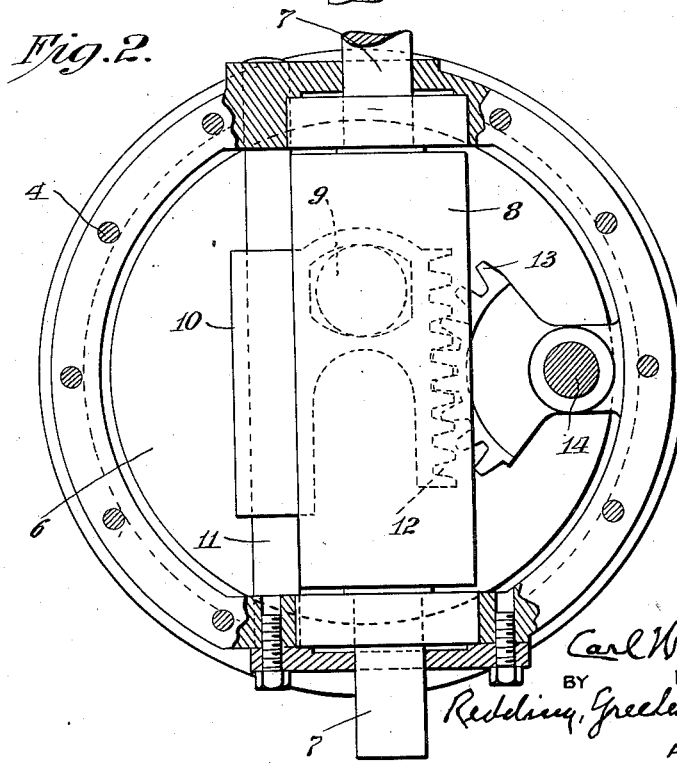
Figure 2 is a sectional plan view of the same on the line 2—2 of Figure 1.

In the embodiment of the invention shown in the drawing the transmission elements are supported in a suitable housing which, as shown, may consist of a lower member 1, an upper member 2, and a cylindrical intermediate member 3, these members being suitably flanged and secured together as by bolts 4. In a suitable bearing in the lower member 1 of the housing is mounted a shaft 5 which may be assumed to be the driving shaft and carries a disc 6. Also mounted in the housing, in suitable bearings, is a shaft 7 which for convenience may be regarded as the driven element and supports a drum or cylinder 8, the axis of which is parallel with the plane of the surface of the disc 6. Between the disc 6 and the drum 8 and in contact with both is placed a sphere 9, which should be hardened, ground smooth and perfectly true and of such diameter that it has a driving contact with the face of the drum 8. The sphere 9 is received in a carriage 10 which is mounted on a rod 11, supported by the housing in parallelism with the shaft 7 and the drum 6, so that the sphere can itself be shifted, while in contact with both the disc and the drum, in either direction, in a path determined by a radius of the disc which is parallel with the axis of the shaft 7, the sphere thus being made to function at a predetermined distance from the axis of the disc, the speed ratio of the driver and the driven element being determined by the radial distance of the sphere from the axis of the disc. It will be understood that the sphere, when in its middle position, has its point of contact with the disc in the line of the axis of the disc and that when it is shifted to vary the speed ratio the point of contact of the sphere moves always in a path determined by a radius of the disc parallel with the axis of the shaft 7. The sphere may be conveniently displaced in order to function at different radial distances from the axis of the disc by a carriage 10, in an opening of which the sphere is retained, the carriage beinng mounted on a shaft 11, supported in the housing and provided with a rack 12 for engagement with a gear segment 13 on a shaft 14 mounted in the housing.

If the drum 8 were placed with its axis in the plane which includes the extended axis of the disc 6 it would be impossible, without the provision of pressure creating devices, to be assured of positive transmission of power from one element to the other. By the present invention it has been made possible, without the provision of other adventitious devices to assure under all conditions, within the reasonable limits of speed and torque, the positive transmission of power from one element to the other without slip. In accordance with the invention the drum 8 is displaced from the plane which includes the extended axis of the disc 6 by such an extent that the angle between the line at *a, b*, which is drawn from the point of contact of the sphere 9 and the disc 6 through the point of contact of the sphere 9 and drum 8, and the line *c, d*, which is drawn from the center of the sphere 9 through the axis of the drum 8 shall be within the friction angle of the materials of which the three elements, the disc, the sphere and the drum, are formed. It will be obvious that this angle will vary slightly with different materials suitable for use in the transmission, the angle for hardened steel being about 4½ degrees. It is unnecessary to explain why the offsetting of the drum as described results in a positive transmission of power from the driving element to the driven element without slip. It is enough that such displacement does in fact accomplish the desired purpose.

I claim as my invention:

1. In a transmission, the combination of a rotatable disc, a rotatable drum mounted with its axis parallel with the surface of the disc, and a sphere in contact with the disc and the drum, the drum being offset from the extended axis of the disc so that the angle between a line which is drawn from the point of contact of the sphere and disc at the center of the disc and the point of contact of the sphere and drum, and a line which is drawn from the center of the sphere through the axis of the drum, shall be within the angle of friction of the material used.

2. In a transmission, the combination of a rotatable disc, a rotatable drum mounted with its axis parallel with the surface of the disc, a sphere in contact with the disc and the drum, and a carriage for the sphere mounted to move in a direction parallel with the axis of the drum, the drum being offset from the extended axis of the disc so that the angle between a line which is drawn from the point of contact of the sphere and disc at the center of the disc and the point of contact of the sphere and drum, and a line which is drawn from the center of the sphere through the axis of the drum, shall be within the angle of friction of the material used.

CARL W. WEISS.